United States Patent
Chen (10) Patent No.: US 10,611,067 B2
(45) Date of Patent: Apr. 7, 2020

(54) SYSTEM AND METHOD FOR PACKAGING FREQUENCY IDENTIFICATION DEVICE AND RFID DEVICE FORMED THEREOF

(71) Applicant: Securitag Assembly Group Co., Ltd, Taichung (TW)

(72) Inventor: Way Yu Chen, Taichung (TW)

(73) Assignee: Securitag Assembly Group Co., Ltd, Taichung (TW)

( * ) Notice: Subject to any disclaimer, the term of this patent is extended or adjusted under 35 U.S.C. 154(b) by 0 days.

(21) Appl. No.: 16/119,925

(22) Filed: Aug. 31, 2018

(65) Prior Publication Data

US 2019/0111594 A1  Apr. 18, 2019

(30) Foreign Application Priority Data

Oct. 17, 2017  (TW) .............................. 106135526 A (51) Int. Cl.
*G06K 19/00* (2006.01)
*B29C 45/00* (2006.01)
(Continued)

(52) U.S. Cl.
CPC .......... *B29C 45/0001* (2013.01); *B29C 33/38* (2013.01); *B29C 39/10* (2013.01);
(Continued)

(58) Field of Classification Search
USPC .......... 235/435, 439, 454, 487, 492; 340/10, 340/572
See application file for complete search history.

(56) References Cited

U.S. PATENT DOCUMENTS

| 4,200,706 A | 4/1980 | Starks |
| 6,021,949 A | 2/2000 | Boiron |

(Continued)

FOREIGN PATENT DOCUMENTS

| TW | 200813855 A | 3/2008 |
| TW | 201110028 A | 3/2011 |
| TW | 201513467 A | 4/2015 |

OTHER PUBLICATIONS

Taiwanese Office Action, dated Mar. 13, 2019, in a counterpart Taiwanese patent application, No. TW 106135526.

*Primary Examiner* — Matthew Mikels
(74) *Attorney, Agent, or Firm* — Chen Yoshimura LLP (57) ABSTRACT

The present invention provides a system and method for packaging RFID device, in which a flexible mold with low surface energy having a mold cavity formed on a surface thereof is provided, an RFID device having RFID chip and antenna coupled thereto is then arranged in the mold cavity, a thermosetting material is filled in the mold cavity under a first atmospheric pressure produced by a pressure controlling device whereby the RFID device is completely covered by the thermosetting material, after that, the pressure controlling device provides a second atmospheric pressure higher than the first atmospheric pressure under a temperature lower than the curing temperature of the thermosetting material, and finally, the temperature is increased to the curing temperature under the second atmospheric pressure for curing the thermosetting material thereby forming an RFID package having the RFID device and the thermosetting material covered the RFID device.

12 Claims, 5 Drawing Sheets

(51) Int. Cl.
  *B29C 45/14*  (2006.01)
  *B29C 45/72*  (2006.01)
  *G06K 19/077*  (2006.01)
  *B29C 39/10*  (2006.01)
  *B29C 33/38*  (2006.01)
  B29L 31/34  (2006.01)
  B29K 101/10  (2006.01)

(52) U.S. Cl.
  CPC .... *B29C 45/14819* (2013.01); *B29C 45/7207* (2013.01); *G06K 19/07724* (2013.01); *B29K 2101/10* (2013.01); *B29K 2883/00* (2013.01); *B29L 2031/3456* (2013.01)

(56) References Cited

U.S. PATENT DOCUMENTS

| | | | |
|---|---|---|---|
| 2007/0139202 A1* | 6/2007 | Austin | B29C 45/14639 340/572.8 |
| 2008/0252425 A1 | 10/2008 | Okegawa et al. | |
| 2011/0133362 A1 | 6/2011 | Sanada et al. | |
| 2012/0055013 A1* | 3/2012 | Finn | H01Q 1/2225 29/600 |
| 2013/0249132 A1 | 9/2013 | Thompson | |
| 2013/0284815 A1* | 10/2013 | Singleton | B29C 45/14647 235/492 |
| 2014/0104133 A1* | 4/2014 | Finn | G06K 19/07769 343/866 |
| 2014/0332597 A1 | 11/2014 | Gelinotte et al. | |

* cited by examiner

Fig. 4

SYSTEM AND METHOD FOR PACKAGING FREQUENCY IDENTIFICATION DEVICE AND RFID DEVICE FORMED THEREOF This application claims the benefit of Taiwan Patent Application Serial No. 106135526, filed Oct. 17, 2017, the subject matter of which is incorporated herein by reference.

BACKGROUND OF INVENTION

1. Field of the Invention

The present invention is related to a packaging technique, and more particularly, to a system and method for packaging an RFID device and the RFID device formed thereof, in which a flexible mold having low surface energy is utilized to allow the thermosetting material filled therein to encapsulate RFID tag with antenna, thereby forming the RFID device.

2. Description of the Prior Art

Radio frequency identification (RFID) is a communication technology that is mainly formed by a reading/writing device, an RFID device, and wireless signals processing techniques, wherein the RFID device comprises an RFID chip and an antenna circuit. With the dedicated reading/writing device, a contactless communication function can be achieved to externally access the data stored in the RFID device and the data acquired from the RFID device can be transmitted to an application server or a computing system for being processed. The processed data can be applied in various kinds of field, such as security of entrance control, anti-theft device for vehicles, or consuming electronic device, such as smart phone, or camera, for example.

In the conventional arts, for example, a thermosetting material, such as epoxy, is softened by a preheated procedure. After that, the softened thermosetting material is pressurized to inject on to the lead frame and are further heated to reach a curing temperature so as to cure the thermosetting material. This method is broadly adapted in various kinds of automatically packaging process for making electronic elements. However, since the lead frame of the packaged electronic element may still be exposed after the packaging process, a package device completely covered with thermosetting material can't be obtained.

Another package process is a low pressure or high pressure injection techniques with thermoplastic material, such as plastic, for forming a package structure completely covered with the thermoplastic material. However, since the thermoplastic material cannot resist high temperature, the thermal protection effect is insufficient and the function of the electronic element of the package structure may be easily lost due to the high injection pressure.

In addition, a room temperature curing method is also a kind of packaging process for forming package structures. However, since the operation time is short, and the bubble or porosity defects would be generated, the method is not suitable for automatically manufacturing process. Conventionally, the resin is filled into a hardened housing. Accordingly, it is still difficult to obtain the package structure completely covered by the resin by the room temperature curing method.

Moreover, another method like high temperature curing for molding package structure is suitable for automatically manufacturing because the operation time of molding is long enough. However, this method still has porosity and bubble issues when the curing material is heated; therefore, the yield rate of the package structure will be reduced. Conventionally, the resin is filled into a hardened housing such that the package structure completely covered by the resin is hardly obtained.

Other molding methods, such as ultraviolet curing, electronic beam curing, or radiation curing technologies, can also be utilized to package the electronic elements; however, there still has some drawbacks such as, the high cost of the resin utilized in these curing methods, the curing depth depending on the energy of the curing process, and properties of cured strength and anti-moisture being inferior than the thermosetting material, such as epoxy, for example. Likewise, the resin is filled into a hardened housing such that the package structure completely covered by the resin is hardly obtained.

In the conventional arts, such as U.S. Pat. No. 6,021,949 disclosed a gaming or casino token or chip includes a thick flat plastic body provided with a circular through hole in which an electronic identification element is placed. The casing of the device is protected by two protective wafers and. The permanent integration of the casing in the body is supplemented by attaching, for example by laminating, a plastic covering sheet and in each face and of the body. This forms a monobloc rigid assembly for the electronic identification device including a memory which stores identification codes and an inductively coupled transmitter-receiver equipped with an antenna.

Another prior art, such as US. Pub. No. 20140332597 also disclosed value tokens, e.g. gaming chips, formed with a slug having an RFID microchip embedded or encapsulated inside and an EM coil either embedded or encapsulated inside or wrapped around the periphery of the slug. The slug is formed by injection molding two plastic halves with a spacing therebetween for accepting the RFID microchip. The plastic halves are formed from weighted plastic including fillers such as copper, brass and/or tungsten to add extra weight to the plastic halves. In the previously described techniques, the device is formed by plastic material with poor temperature resistance and higher hygroscopicity. In addition, it has to be formed by dual injection process, so it is not a one-piece integrally-formed device.

In addition to the material and manufacturing issues for forming one-piece integrally-formed device, there still has an issue in demoulding process, i.e., removing package structure from the mold. In the conventional art, such as the US. Pub. No. 20110133362, disclosed a mold release films for manufacturing semiconductor resin packages. Although it is capable of using such film for assisting the demoulding process, it cannot be adapted in the mold releasing process in casting manufacturing process. This is because if there has a film in the surface of the mold cavity, the dimension of the product during the casting process will be lost. In addition, when the thermosetting material is utilized with the conventional metal mold, it will become difficult to execute demoulding process after resin is cured. In addition, it will be easy to generate defects on the surface of the product during the demoulding process.

In the conventional casing arts, in order to prevent bubbles from being generated during the curing process, the measures, such as removing bubbles under vacuum condition, slowing down the curing speed under normal temperature, multiple casting, or the curing under high pressure is utilized. Nevertheless, if the previously described measures cannot be adapted with moderate mold and curing process, it is difficult to produce products with superior accuracy and quality. In addition, the foregoingly described measures for preventing the bubbles from being generated will reduce the manufacturing speed so as to affect the manufacture efficiency of the production line.

Accordingly, there has a need for providing a system and method for packaging frequency identification device and RFID device formed thereof.

SUMMARY OF THE INVENTION

In one embodiment, a packaging system and method for RFID are provided, wherein a flexible mold is utilized to allow an RFID device arranged in a mold cavity formed thereon, a thermosetting resin is filled into the mold cavity for encapsulating the RFID device, and finally, the thermosetting resin is cured under a high pressure and high temperature condition. The high pressure is applied on the flexible mold for restraining the bubble size inside the thermosetting resin in the mold cavity, and inhibiting formation of bubble by the gas or air in the porosities of the flexible mold. In addition, the high temperature is applied to increase the speed of cross-link curing effect of the thermosetting resin.

In one embodiment, in order to improve product quality during the demoulding process performed after the thermosetting resin is cured, the flexible mold made of low surface energy material is utilized. However, due to the insufficient wetting of the low surface energy mold, the tiny air bubbles are induced to be attached on the mold surface thereby causing defects after demoulding process. In order to solve the air bubble issues, a high pressure is utilized to eliminate the growth of bubbles. In order to completely eliminate tiny bubbles, a high pressure is utilized to force the bubbles to escape from the surface of mold, and restrain the size of the bubbles that cannot smoothly escape. After that, a subsequent high temperature condition is provided to heat the thermosetting material so as to cure the thermosetting material. Through the high pressure and subsequent high temperature, the defects caused by the air bubbles can be eliminated.

In one embodiment, the present invention provides a method for packaging a radio frequency identification device, comprising steps of providing a flexible mold having a top surface, and a mold cavity formed on the top surface, arranging an RFID device in the mold cavity, wherein the RFID device comprises an antenna coil, and an RFID chip coupled to antenna coil, filling a thermosetting material into the mold cavity under a first atmospheric pressure such that the RFID device is encapsulated by the thermosetting material, providing a second atmospheric pressure on the flexible mold having the RFID device and the thermosetting material under a temperature that is smaller than a curing temperature of the thermosetting material, wherein the second atmospheric pressure is larger than the first atmospheric pressure, and heating the thermosetting material to reach the curing temperature so as to cure the thermosetting material under second atmospheric pressure, thereby forming the radio frequency identification device having the a thermosetting material package.

In one embodiment, the present invention provides a packaging system for radio frequency identification device, comprising a flexible mold, a filling device, a pressure controlling device, a controlling device, and a heating device. The flexible mold has a top surface, and a mold cavity formed on the top surface, wherein an RFID device having an antenna coil and an RFID chip electrically coupled to the RFID antenna coil is arranged inside the mold cavity. The filling device is utilized to fill a thermosetting material into the mold cavity under a first atmospheric pressure. The pressure controlling device is utilized to control an atmospheric pressure where the mold is surrounded. The controlling device is coupled to the pressure controlling device, and controls the filling device to fill the thermosetting material into the mold cavity such that the RFID device is covered by the thermosetting material under the first atmospheric pressure, and controlling the pressure controlling device to provide a second atmospheric pressure on the mold having the RFID device and the thermosetting material under a temperature that is smaller than a curing temperature of the thermosetting material. The heating device is coupled to the controlling device and provides heat to reach the curing temperature under second atmospheric pressure so that the thermosetting material covered the RFID device is cured, thereby forming the radio frequency identification device encapsulated by the cured thermosetting material.

In one embodiment of the step for filling the thermosetting material, it further comprises a filling nozzle is utilized to fill the thermosetting material into the mold cavity along a profile of the mold cavity, wherein the mold is made of polymerized siloxanes, the thermosetting material is polymerized siloxanes, polyurethane, or epoxy resin, the first atmospheric pressure is 1 atm, and the second atmospheric pressure is 3~5 atms, and when the thermosetting material is filled into the mold cavity, the top surface of the mold contacts with the atmospheric environment.

In one embodiment, the curing process is a high temperature curing process, wherein the curing temperature is between 80-150° C.

All these objects achieved by the system and method for packaging RFID device are described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a a system and method for packaging RFID device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
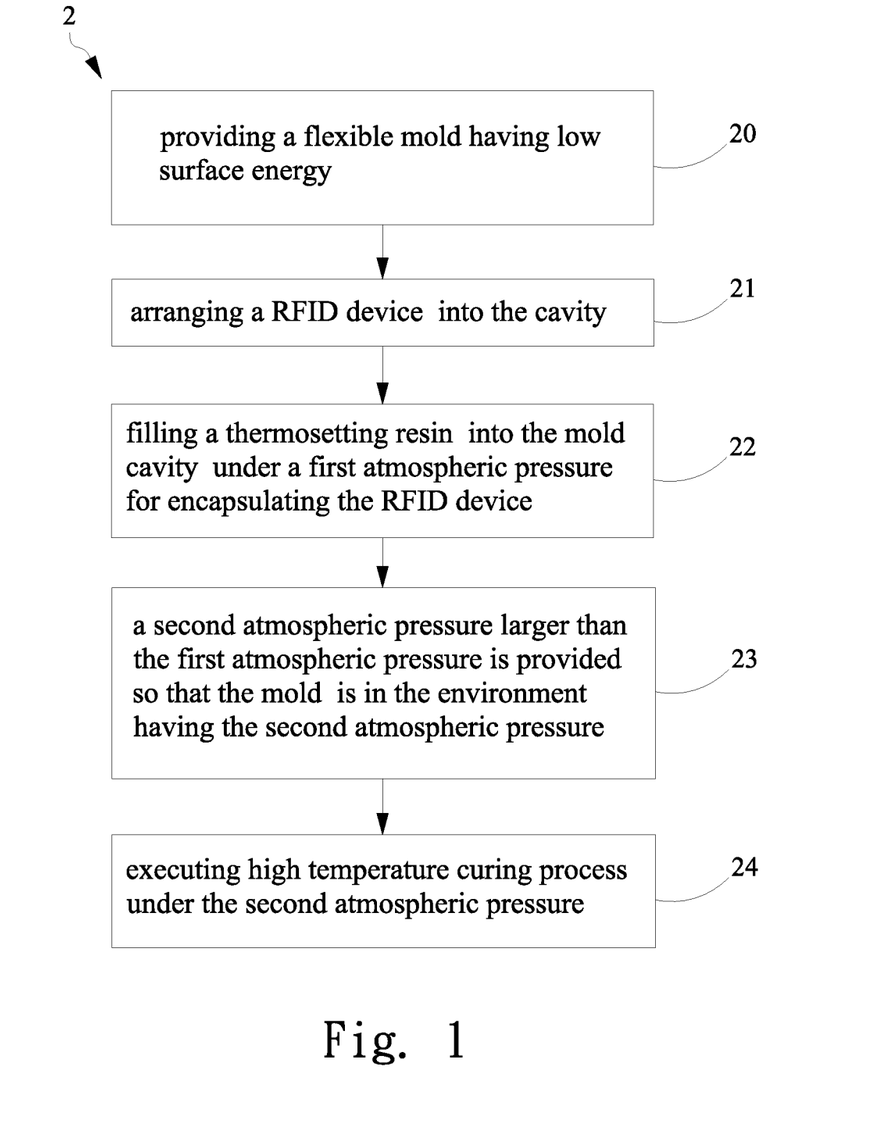
FIG. 1 illustrates a flow chart of the RFID packaging method according to one embodiment of the present invention.

Please refer to FIG. 1, which illustrates a flow chart of the RFID packaging method according to one embodiment of the present invention. In one embodiment, the flow chart comprises a step 20 for providing a flexible mold having low surface energy. The mold has a top surface having a mold cavity formed thereon. Please refer to FIG. 2A, which illustrates a perspective view of a mold according to one embodiment of the present invention. The mold 3 is flexible and made of low surface energy material. The low surface energy material can sustain higher processing temperature, for example 100° C. or above. The example of the lower energy material can be polymerized siloxanes or polysiloxanes, but should not be limited thereto.

Figure 2A:
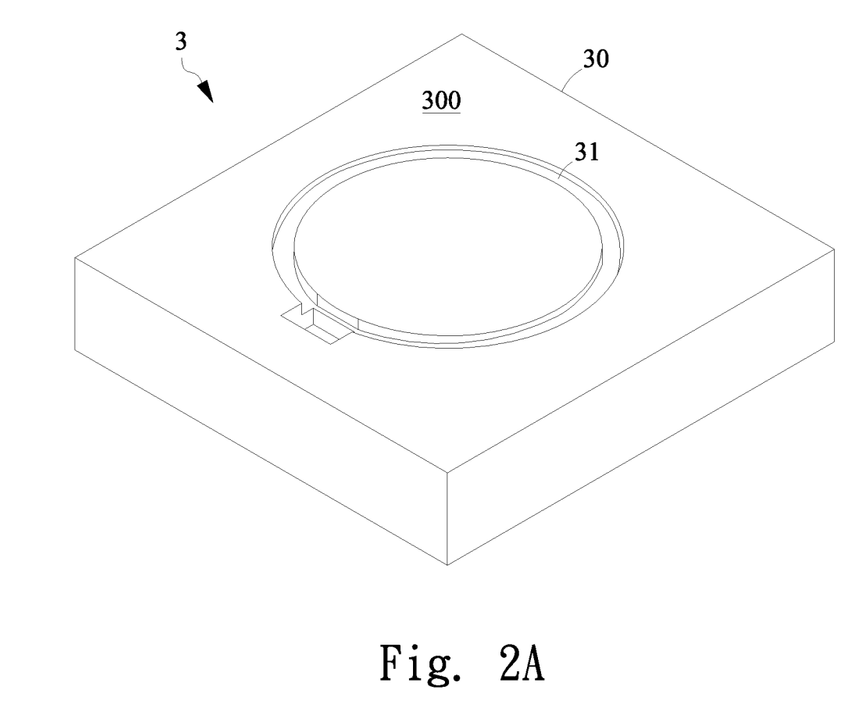
FIG. 2A illustrates a mold according to one embodiment of the present invention.

With the flexible characteristic and low surface energy, the material formed inside the mold cavity can be demoulded smoothly. In one embodiment, the mold 3 has a mold body 30 having the top surface 300. A mold cavity 31 is formed on the top surface 300. It is noted that there has no specific limitation to the shape of the mold cavity 31. It depends on the design of the product shape, so it is not limited to the shape shown in the FIG. 2. In addition, unlike the convention mold having structure of top mold and bottom mold, the mold 3 in the present embodiment, is a one-piece mold. The material for covering or encapsulating the RFID device is poured into the mold cavity 31 along a path fitting the shape of the mold cavity 31 and is cured under a specific environmental condition which will be described in detail in the following.

Figure 2B:
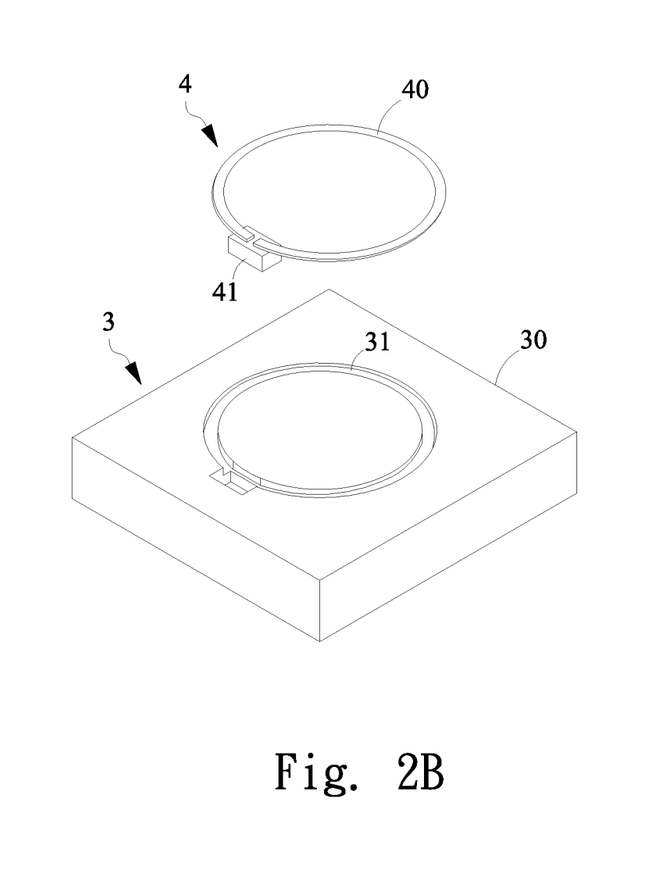
FIG. 2B illustrates an RFID device arranged in a mold cavity according to one embodiment of the present invention.

Please refer to FIG. 1 and FIG. 2B, after step 20, a step 21 is performed to arrange an RFID device 4 into the cavity 31. In the present invention, the RFID device 4 comprises an antenna coil 40 and an RFID chip unit 41 electrically coupled to the antenna coil 40. In one embodiment, the RFID chip unit 41 further has a substrate. An RFID chip and a plurality of passive elements are formed on the substrate and are electrically coupled to each other. It is noted that, in addition to RFID chip and passive elements, at least one sensor, such as temperature sensor, moisture sensor, accelerator, and/or electrical compass can be formed on the substrate. The choice of sensor types is depending on the user's need without any specific limitation. The antenna coil 40 is electrically coupled to the RFID chip unit 41 for forming an antenna circuit. In the present embodiment, the RFID chip can be, but should not be limited to, a passive RFID chip. Alternatively, RFID chip can also be an active RFID chip.

Figure 2C:
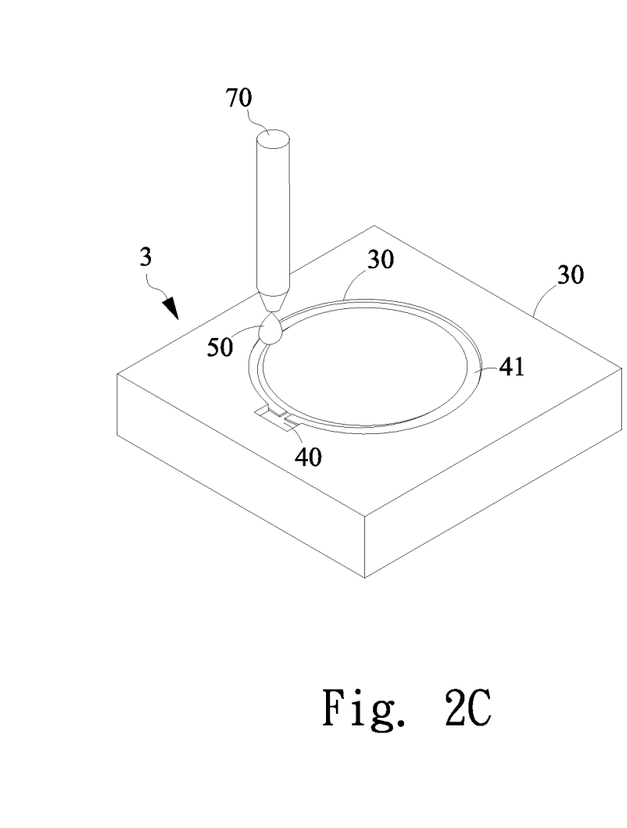
FIG. 2C illustrates that the thermosetting resin is poured into the mold cavity according to one embodiment of the present invention.
Figure 2D:
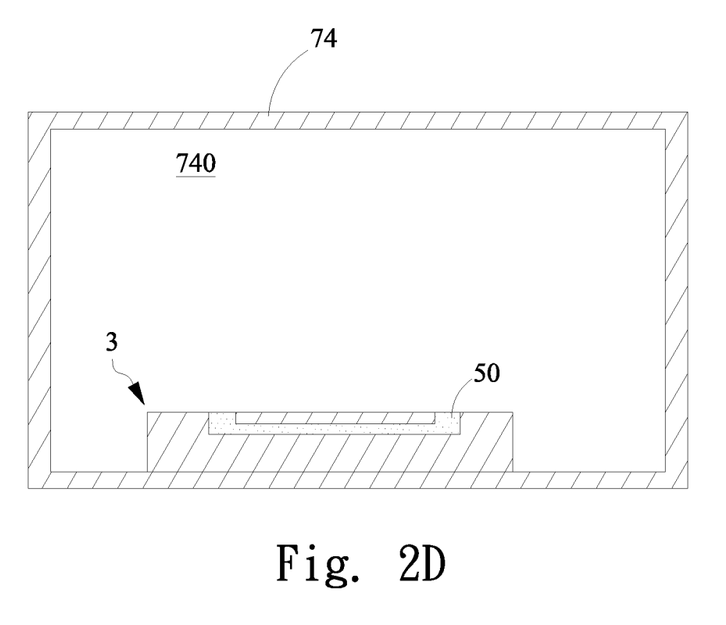
FIG. 2D illustrates a chamber having pressure and temperature control according to one embodiment of the present invention.

Please refer to FIG. 1 and FIG. 2C, after step 21, a step 22 is performed to fill a thermosetting resin 50 into the mold cavity 31 under a first atmospheric pressure for covering or encapsulating the RFID device 4. In the present step, the thermal energy smaller than required curing energy of thermosetting resin 50 is provided whereby the viscosity of the thermosetting resin is decreased so as to increase the mobility and extending capability for filling the mold cavity. In one embodiment, unlike conventional top mold to cover the flexible mold for preventing the mold cavity from contacting the atmosphere directly, during the process that the thermosetting material is filled into the mold cavity, the top surface of the mold and the thermosetting material contact with air in the atmospheric environment. Under the first atmospheric pressure, such as normal pressure or lower than the normal pressure, the thermosetting resin is poured into the mold cavity by the filling device 70 moving along the profile path of the mold cavity 31. The thermosetting resin, in one embodiment, is an epoxy resin having curing temperature over 70° C. In one embodiment, the epoxy can be, but not limited to, a two-part, also called two-component, epoxy. Alternatively, the thermosetting resin can also be polymerized siloxanes (silicone), or polyurethane (PU). When the two-part epoxy with higher curing temperature characteristic is adapted, the epoxy can be operated for 24 hours under room temperature, e.g. 25° C., whereby the process of automated production will become easy to scheme.

Figure 4:
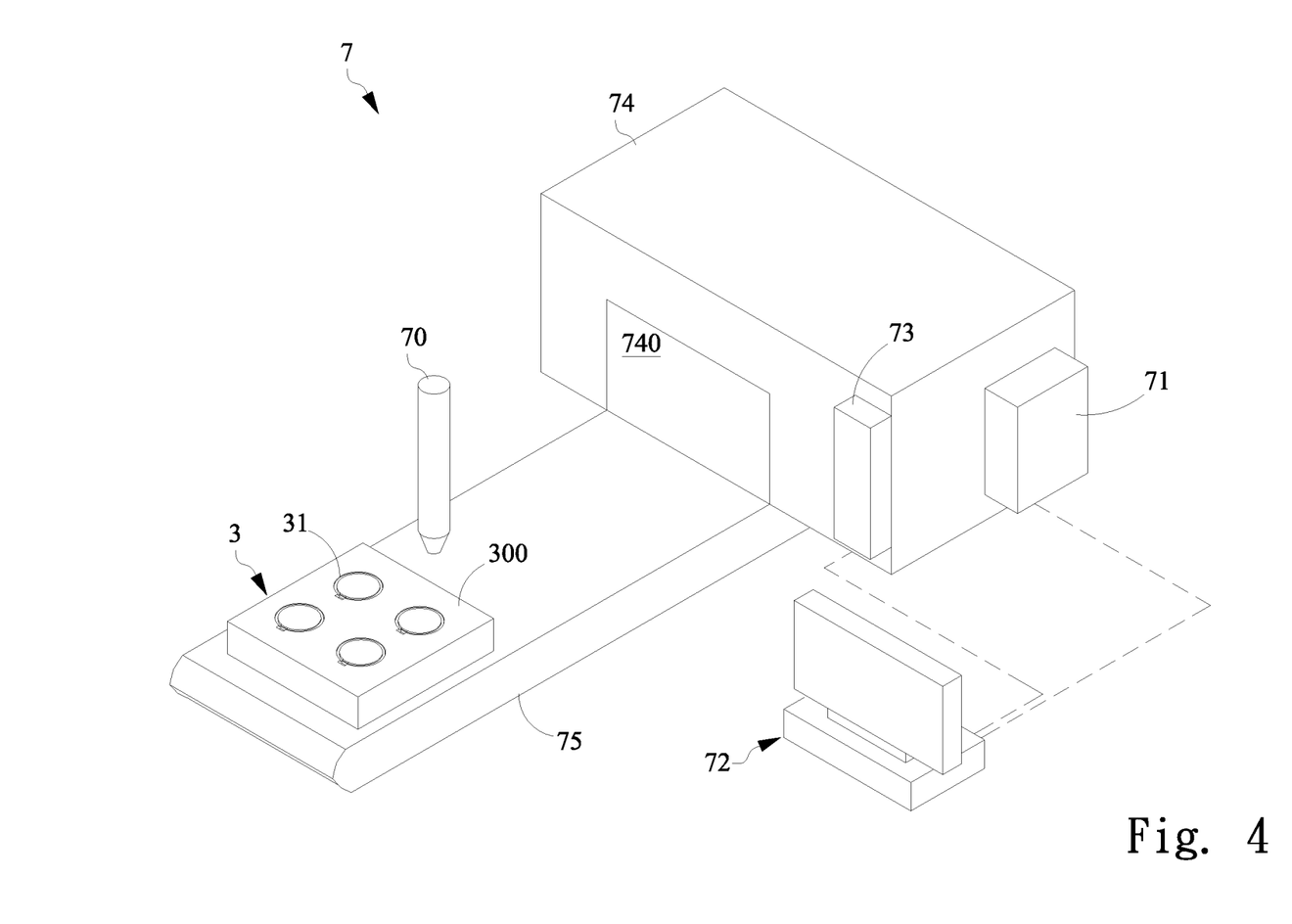
FIG. 4 illustrates an RFID packaging system for packaging RFID device according to one embodiment of the present invention.

Please refer to FIG. 1, in the next step 23, a second atmospheric pressure larger than the first atmospheric pressure is provided to make the flexible mold having the RFID device and the thermosetting resin is in the environment having the second atmospheric pressure and the temperature lower than the curing temperature of the thermosetting resin. In the present step, as illustrated in FIG. 4, the mold cavity 31 filled with the thermosetting resin is arranged in a chamber room 740 of a reaction chamber 74. The temperature inside the chamber room 740 is controlled to be lower than the curing temperature of the thermosetting resin. When the mold 3 is arranged in the chamber room 740, the atmospheric pressure is increased to the second atmospheric pressure, such as 3-5 atms, for example. When the high pressure exerts on the mold 3, the air bubbles on the surface of the filled resin are forced to be escaped from the filled resin, as well as the size of the air bubbles that cannot be escaped are restrained as well.

Finally, a step 24 is performed to execute high temperature curing process under the second atmospheric pressure. In the step 24, the thermosetting resin is heated to reach the curing temperature whereby the thermosetting resin 50 is cured to form an RFID package 4a comprising RFID device 4 and cured thermosetting resin 50 encapsulating the RFID device 4 for completely preventing the RFID device 4 from directing contact with the atmospheric environment such that the RFID device 4 in the cured thermosetting material becomes moisture-proof or moisture resistant and isolation from gas or air or from the atmospheric environment. In one embodiment, during process of curing the thermosetting material, the thermosetting material and the top surface directly contacts with air of the atmospheric environment. The curing temperature is ranged between 80~150° C. In the present embodiment, the curing temperature is 120° C. Since the air bubbles located at interface between the thermosetting resin and mold surface, including the air bubbles attached on the surface of the thermosetting resin or gas/air hidden in the porous surface of the mold, for example, that cannot be escaped from the thermosetting resin, will be inflated during the heating process, this phenomena could affect the product quality after curing process. Accordingly, when the thermosetting resin is heated to be cured under the second atmospheric pressure, such as 3-5 atms, within a specific duration of time such as 30 minutes, for example, the high pressure can restrain the growth of the air bubbles, and the high temperature can accelerate the generation of cross-link curing effect of the thermosetting resin whereby a package structure completely encapsulated by the thermosetting resin and fully fitted the shape of the mold cavity can be obtained. The high pressure and high temperature control can solve the problem of air bubbles, and porosities during the mold filling process.

It is noted that the thermosetting resin can be divided into different kind of types according to the curing temperature. For example, room temperature curing type with a curing temperature range between 20~30° C., low temperature curing type with a curing temperature range between 60~80, and previously described type that has high curing temperature. In the present embodiment, after filling the thermosetting resin into the mold cavity, the curing procedure will be proceeded. However, since the high temperature curing process will induce the air bubbles easily, if the curing process is performed under high pressure environment, the air bubbles problem can be overcome.

It is noted that the room temperature curing type or the low temperature curing type thermosetting resin can be chosen as the encapsulant material for covering the RFID device because the possibility of bubble generation can be reduced; nevertheless, the curing time will be long to increase the time cost or reduce the productivity and, in addition, the curing result will be insufficient or even incomplete curing result will be occurred if the temperature is too low. Moreover, in the normal temperature curing type thermosetting material, since the cross-link agents are added into the thermosetting material, i.e. completely becoming A(primary resin)/B(curing agent) mixed resin, the curing reaction will be very slow under the room temperature or normal temperature. Accordingly, if there is a need to increase the curing efficient under the room temperature, it is necessary to add catalytic agent into the resin. However, this will reduce the pot life of the thermosetting resin. In addition, when the low temperature or room temperature type of thermosetting material is utilized, it will also has phenomenon that the external surface of the thermosetting resin is cured but the curing reaction, i.e. cross-link transformation, in the internal part is still incomplete whereby the mechanical properties will become worse due to the reduction of glass transition temperature (Tg). It is noted that the cross-link curing reaction is an exothermic reaction, the higher the temperature is, the faster and more complete the curing reaction will be.

Regarding the way to determine if the curing is complete or incomplete, a differential scanning calorimetry (DSC) can be utilized to measure the curing status. In one embodiment, the DSC is utilized to increase temperature with a constant rate so that exothermic-endothermic curve of dry resin and wet resin can be respectively measured thereby obtaining a cross-link degree. For a cured resin, if it can be determined that the cured resin still have exothermic curve, it means that the curing reaction is incomplete. In addition, according to the DSC scanning curve, the variation of the Tg can also be obtained. For the cured epoxy, if the Tg is higher, it represents the mechanical strength of the cured structure is better. If the epoxy is cured under high temperature, the mechanical property will become superior. Besides, since most epoxy contains component of bisphenol A (BPA), if the curing reaction is incomplete, the possibility for separating out the monomer molecular will be easily occurred. Therefore, when the epoxy is cured under normal temperature or low temperature condition, it might be a concern that the unwanted BPA will be separated out from the resin.

Figure 3:
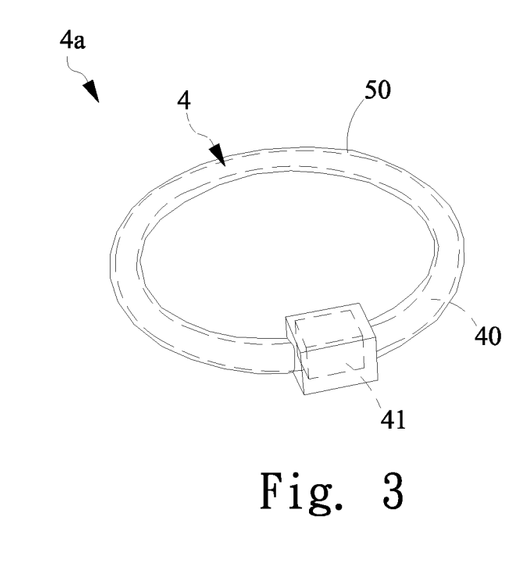
FIG. 3 illustrates an RFID package formed by the packaging process according to one embodiment of the present invention.

Please refer to FIG. 3, which illustrates an RFID package formed by the packaging process according to one embodiment of the present invention. In the present embodiment, after the step 24, the RFID device 4 is completely encapsulated by the thermosetting resin 50 and the packaging device is demoulded from the mold so as to form an RFID package 4a having a waterproof and high temperature-resistance characteristics as well as easily demoulded merit with a better surface quality. It is noted that, the main objective of the present invention is to provide easily demoulded RFID package 4a by the previously described manufacturing flow; therefore, there has no specific limitation on the shape of the RFID package 4a, and it is not limited to the circular shape shown in the figures of the present invention.

Please refer to FIG. 4, which illustrates an RFID packaging system for packaging RFID device according to one embodiment of the present invention. In the present embodiment, the packaging system 7 comprises a flexible mold 3 with low surface energy property, a filling device 70, a pressure controlling device 71, a controlling device 72, a heating device 73, and a reaction chamber 74. The mold 3 has a top surface 300 having a plurality of mold cavities 31, each of which is available for allowing an RFID device 4 arranged therein. The mold 3 and mold cavity 31 is similar to the previously described embodiments, and it will not be described hereinafter. It is noted that, the quantities of the mold cavities 31 on the top surface 300 is determined according to the mold size and user's requirement, and it will not be limited to the amounts shown in the figures of the present invention.

The filling device 70 having the thermosetting resin is utilized to pour the thermosetting resin into the mold cavity 31 under the first atmospheric pressure. The quantity of the filling devices 70 is determined according to the user's need and manufacturing efficiency so it will not be limited to the amount shown in the figure. In the present embodiment, the first atmospheric pressure can be, but should not be limited to normal pressure, i.e., 1 atm. The pressure controlling device 71 is utilized to control the atmospheric pressure of the environment where the mold 3 exists. The pressure controlling device 71 is electrically coupled to the controlling device 72 for receiving the control signal from the controlling device 72 and controls the atmospheric pressure of the chamber room 740 of the reaction chamber 74 in response to the control signal.

The controlling device 72 is electrically coupled to the pressure controlling device 71, the heating device 73, and the filling device 70. The controlling device 72 controls the filling device 71 to pour the thermosetting resin into the mold cavity 31 under the first atmospheric pressure such that the thermosetting resin encapsulates the RFID device. The controlling device 72 also controls the pressure controlling device 71 to provide the second atmospheric pressure higher than the first atmospheric pressure exerting on the mold 3 and thermosetting resin under the temperature that is lower than the curing temperature of the thermosetting resin. In the present invention, the second atmospheric pressure is around 3-5 atms. The controlling device 72 is a device having signal processing and calculating capability such as computer, workstation or notebook, for example, for executing the software program to operate the flow chart shown in FIG. 1. The heating device 73 is electrically coupled to the controlling device 72 for heating the thermosetting resin to achieve the temperature that is able to cure the thermosetting resin.

In the present embodiment, the mold 3 can be transported to the processing station of filling device 70 or reaction chamber 74 by an automatic transportation device 75. The automatic transportation device 75 is electrically coupled to the controlling device 72. In one embodiment, the automatic transportation device 75 can be, but should not be limited to, a conveying belt module. Alternatively, the automatic transportation device 75 can also be a robot. It is noted that although the filling device 70 and reaction chamber 74 are separated in the present embodiment, alternatively, the filling device 74 can also be integrated into the reaction chamber 74 whereby all the packaging steps, such as filling step, temperature and pressure control steps, are performed in the reaction chamber 74.

While the present invention has been particularly shown and described with reference to a preferred embodiment, it will be understood by those skilled in the art that various changes in form and detail may be without departing from the spirit and scope of the present invention.

What is claimed is:

1. A method for packaging a radio frequency identification (RFID) device, comprising steps of:
   providing a flexible mold in an atmospheric environment, the flexible mold having a top surface, and a mold cavity formed on the top surface, wherein the flexible mold has no top mold to cover the flexible mold;
   arranging the RFID device in the mold cavity, wherein the RFID device comprises an antenna coil, and an RFID chip coupled to antenna coil;
   filling a thermosetting material into the mold cavity under a first atmospheric pressure whereby the RFID device is covered by the thermosetting material, wherein during the filling process that the thermosetting material is filled into the mold cavity, the top surface of the mold and the thermosetting material contact with air in the atmospheric environment;
   while the top surface of the thermosetting material contacts with air, providing a second atmospheric pressure on the flexible mold having the RFID device and the thermosetting material under a temperature that is smaller than a curing temperature of the thermosetting material, wherein the second atmospheric pressure is larger than the first atmospheric pressure; and
   heating the thermosetting material to reach the curing temperature so as to cure the thermosetting material under the second atmospheric pressure so as to form the RFID device having a thermosetting material package.

2. The method of claim 1, wherein in the step of filling the thermosetting material further comprises utilizing a filling nozzle to fill the thermosetting material into the mold cavity along a profile of the mold cavity.

3. The method of claim 1, wherein the flexible mold is made of polymerized siloxanes, and the thermosetting material is polymerized siloxanes, polyurethane, or epoxy resin.

4. The method of claim 1, wherein the first atmospheric pressure is 1 atm, and the second atmospheric pressure is 3~5 atms.

5. The method of claim 1, wherein during the step of curing the thermosetting material, the thermosetting material and the top surface contacts with the atmospheric environment.

6. The method of claim 1, wherein the curing temperature is between 80-150° C.

7. A packaging system for a radio frequency identification (RFID) device, comprising:
   a flexible mold, arranged in an atmospheric environment, the flexible mode having a top surface, and a mold cavity formed on the top surface, wherein the flexible mold has no top mold to cover the flexible mold, wherein an RFID device having an antenna coil and an RFID chip coupled to the RFID antenna coil is arranged inside the mold cavity;
   a filling device, configured to fill a thermosetting material into the mold cavity under a first atmospheric pressure while keeping the top surface of the flexible mold and the thermosetting material in contact with air in the atmospheric environment;
   a pressure controlling device, configured to control an atmospheric pressure of the atmospheric environment where the flexible mold is surrounded;
   a controlling device, coupled to the pressure controlling device, the controlling device controlling the filling device to fill the thermosetting material into the mold cavity whereby the RFID device is covered by the thermosetting material under the first atmospheric pressure, and controlling the pressure controlling device to provide, while the top surface of the thermosetting material is kept in contact with the air, a second atmospheric pressure on the flexible mold having the RFID device and the thermosetting material under a temperature that is smaller than a curing temperature of the thermosetting material; and
   a heating device, coupled to the controlling device, the heating device heating the thermosetting material to reach the curing temperature under second atmospheric pressure so as to cure the thermosetting material covered the RFID device thereby forming the RFID device having a thermosetting material package.

8. The system of claim 7, wherein the filling device further comprises a filling nozzle which is utilized to fill the thermosetting material into the mold cavity along a profile of the mold cavity.

9. The system of claim 7, wherein the flexible mold is made of polymerized siloxanes, and the thermosetting material is polymerized siloxanes, polyurethane, or epoxy resin.

10. The system of claim 7, wherein the first atmospheric pressure is 1 atm, and the second atmospheric pressure is 3-5 atms.

11. The system of claim 7, wherein the curing temperature is between 80-150° C.

12. The system of claim 7, wherein during the step of curing the thermosetting material, the thermosetting material and the top surface contacts with the atmospheric environment.

* * * * *